United States Patent Office 3,422,196
Patented Jan. 14, 1969

---

3,422,196
UTILIZING 1 - (3,5 - DIHYDROXYPHENYL)-1-HY-
DROXY - 2 - ISOPROPYLAMINOETHANE AND
SALTS THEREOF IN THE TREATMENT OF
BRONCHIAL SPASMS
Otto Thoma and Karl Zeile, Ingelheim am Rhein, Germany, assignors to Boehringer Ingelheim G.m.b.H.,
ABW CDA Ingelheim am Rhein, Germany, a corporation of Germany
No Drawing. Original application Feb. 3, 1964, Ser.
No. 342,290, now Patent No. 3,341,594, dated Sept. 12,
1967. Divided and this application July 19, 1967, Ser.
No. 654,350
Claims priority, application Germany, Nov. 30, 1962,
B 56,662
U.S. Cl. 424—266                                3 Claims
Int. Cl. A61k 25/00

---

ABSTRACT OF THE DISCLOSURE

The composition contains 1-(3,5-dihydroxyphenyl)-1-hydroxy-2-isopropylaminoethane or a nontoxic acid addition salt thereof as a bronchospasmolytic ingredient.

---

This is a division of copending application Ser. No. 342,290, filed Feb. 3, 1964, now U.S. Patent No. 3,341,594, issued Sept. 12, 1967, which in turn is a continuation-in-part of application Ser. No. 89,123, filed Feb. 14, 1961, and now abandoned.

This invention relates to a bronchospasmolytic composition containing as a bronchospasmolytic component 1-(3,5-dihydroxyphenyl)-1-hydroxy - 2 - isopropylaminoethane or a nontoxic acid addition salt thereof, as well as to a method of relieving bronchial spasms with the aid of said composition.

More particularly, the present invention relates to a pharmaceutical composition for relieving bronchial spasms, comprising as a bronchospasmolytic component the free base of the formula

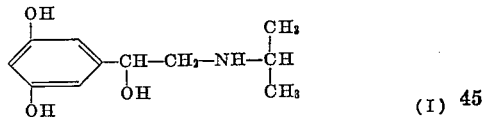

(I)

or a nontoxic, pharmacologically acceptable acid addition salt thereof.

The compound of the Formula I above may be prepared by a number of different methods, among which the following have been found to be most convenient and efficient:

METHOD A

Reduction of a compound of the formula

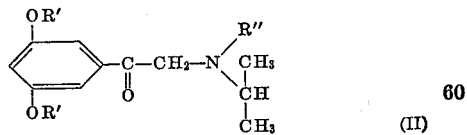

(II)

wherein

R' is hydrogen or a group which may readily be transformed into hydrogen, such as acyl, aralkyl or alkyl, and R" is hydrogen or aralkyl, with a suitable reducing agent. Thus, the reduction may be effected by catalytic hydrogenation in the presence of Raney nickel or palladinized charcoal, or also with lithium-aluminum-hydride or with sodium borohydride. The reduction yields compounds of the formula

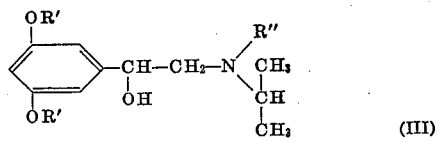

(III)

wherein R' and R" have the same meanings as defined above.

If R' in Formula III is alkyl, the alkoxy group may be converted into hydroxy by means of ether-splitting agents, for example by heating with hydrogen halide acids. During this ether cleavage reaction it is advantageous to protect the alcoholic hydroxyl group by acetylation and to effect the cleavage with hydrogen bromide in anhydrous glacial acetic acid or a mixture of glacial acetic acid and acetic acid anhydride. If both R' and R" are aralkyl, these radicals may be converted into hydrogen by reduction.

Whatever methods are used to convert R' and R" into hydrogen, the final product is a compound of the Formula I above.

The starting compounds of the Formula II used in this method may be obtained in accordance with customary methods, for example by substituting the halogen atom of a 1-(3,5-dialkoxyphenyl)-1-oxo-2-haloethane by an isopropylamino group in accordance with known processes.

METHOD B

Reduction of a diketo compound of the formula

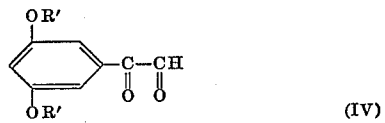

(IV)

wherein R' has the same meanings as defined in connection with Formula II above, in the presence of isopropylamino without isolation of intermediate compounds to form a compound of the formula

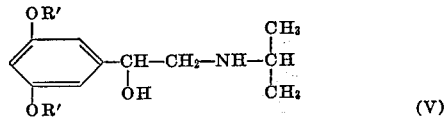

(V)

The reduction may be effected by methods customary for such reactions, such as by catalytic hydrogenation with Raney nickel or with palladized charcoal. For final conversion into the compound of the Formula I, the radicals R' in compound V may be converted into hydrogen in the manner described in Method A above.

METHOD C

Reaction of a compound of the formula

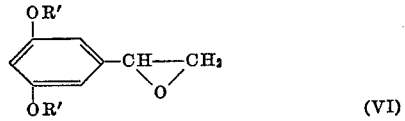

(VI)

with an amine of the formula

(VII)

to form a compound of the Formula III above. In Formulas VI and VII substituents R' and R" have the same meanings as previously defined. The above reaction may be performed in the usual manner, for instance at temperatures between 0 and 100° C., preferably 10–30° C., in aqueous alcoholic solution. The conversion of R' and R" into hydrogen to obtain the compound of the Formula I may be accomplished by the methods described in Method A.

METHOD D

Introduction of the isopropyl group into a compound of the formula

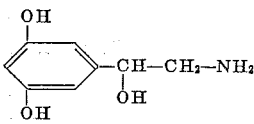
(VIII)

The compound of the Formula VIII may in turn be prepared by reduction of an isonitrosoketone of the formula

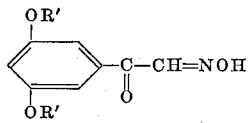
(IX)

or by acid cleavage of an oxazolidone-2 compound of the formula

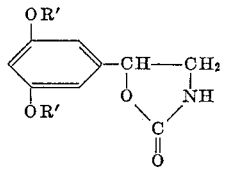
(X)

The exchange of R' for hydrogen is accomplished as described in Method A.

The introduction of the isopropyl group into compound VIII is accomplished by customary methods, such as by reaction with isopropyl halides. In order to avoid the formation of tertiary bases, the benzaldehyde condensation product of Compound VIII is advantageously reacted with the isopropyl halide, and the quaternary compound of the formula

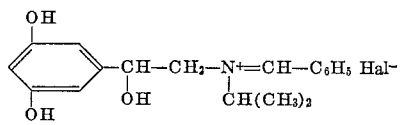
(XI)

wherein Hal is halogen, thus formed is then split with water into compound I and benzaldehyde.

However, it is also possible to obtain Compound I from Compound VIII by reductive isopropylation, that is, by reacting the primary amine VIII with acetone and thereafter subjecting the intermediate Schiff's base to catalytic hydrogenation to form Compound I.

The following examples further illustrate the invention and will enable others skilled in the art to understand it more completely.

Example 1.—1-(3,5-dihydroxyphenyl)-1-hydroxy-2-isopropylaminoethane sulfate by Method A 59 gm. of 1-(3,5-dihydroxyphenyl)-2-isopropylaminoethane (free base) were dissolved in 590 cc. of methanol, and the solution was hydrogenated in the presence of about 80 gm. Raney nickel at room temperature and under a pressure of 5 atm. Hydrogen absorption was terminated after a few minutes. The catalyst was separated by vacuum filtration, and the filtrate, an ethanolic solution of 1-(3,5-dihydroxyphenyl)-1-hydroxy-2-isopropylaminoethane, was admixed with the calculated amount of an alcoholic 20% sulfuric acid solution. A crystalline precipitate formed which was filtered off and washed with alcohol. For purification, the product was dissolved in water and the solution was filtered through iron-free charcoal. Thereafter, the filtrate was evaporated to dryness in vacuo and the residue was taken up in alcohol. The crystalline precipitate which separated out after some standing was separated by vacuum filtration and washed with alcohol. After recrystallization from 90% ethanol, 61 gm. (83.2% of theory) of 1-(3,5-dihydroxyphenyl)-1-hydroxy-2-isopropylaminoethane sulfate, M.P. 202–203° C., of the formula

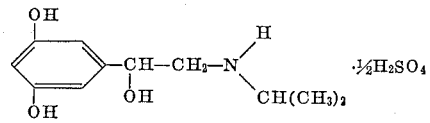

were obtained.

To convert the salt into the free base it was dissolved in a small amount of water, and the solution was neutralized with aqueous ammonia. The crystalline precipitate which formed after some standing was separated by vacuum filtration and washed with water. Melting point of the free base: 100° C.

Example 2.—1-(3,5-dihydroxyphenyl)-1-hydroxy-2-isopropylaminoethane hydrobromide by Method B (a) Preparation of 3,5-dimethoxyphenyl-glyoxal: 11.2 gm. of selenium dioxide were dissolved in 2 cc. of water at 50–60° C. 18 gm. of 3,5-dimethoxyacetophenone were added to the solution, and the resulting mixture was heated for eight hours on a water bath at 100° C. Thereafter, it was allowed to stand overnight at room temperature, the precipitated selenium was filtered off, the filtrate was vacuum filtered through charcoal and this filtrate was evaporated in vacuo. The residue was covered with water and occasionally stirred until the initially brown oil had crystallized throughout. Recrystallized from a mixture of dioxane and petroleum ether, the product of the formula

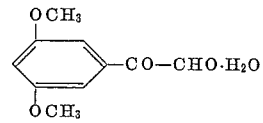

had a melting point of 92° C. The yield was 16.0 gm., which corresponds to 75% of theory.

(b) Preparation of 1-(3,5-dimethoxyphenyl)-1-hydroxy-2-isopropylaminoethane hydrochloride: A mixture of 2 gm. of 3,5-dimethoxyphenyl-glyoxal hydrate and 7 gm. isopropylamine and 80 cc. of methanol was maintained for one-half hour at 45–50° C. and was then hydrogenated in the presence of Raney nickel under normal hydrogenation conditions. Almost 2 mols of hydrogen were absorbed. After separating the catalyst by vacuum filtration, the methanol was distilled off and the residue was taken up in ether. Ethereal hydrochloric acid was added to the ether solution, whereby a precipitate formed which was separated and recrystallized from a mixture of methyl ethyl ketone and ether. The product, M.P. 146° C., of the formula

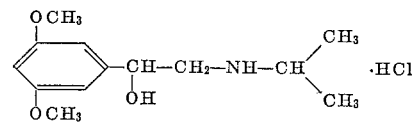

was obtained with a yield of 1.7 gm. (65.5% of theory).

(c) Preparation of 1-(3,5-dihydroxyphenyl)-1-hydroxy-2-isopropylaminoethane hydrobromide: A mixture of 7 gm. of 1-(3,5-dimethoxyphenyl)-1-hydroxy-2-isopropylaminoethane hydrochloride and 70 cc. acetic acid anhydride was refluxed for one hour on an oil bath. The reaction mixture was allowed to cool and then, while cooling to 20° C., 25 cc. of 66% hydrogen bromide were added. The mixture was again refluxed for one hour on an oil bath (internal temperature 105° C.) and was again allowed to cool. Thereafter, while cooling to 20° C., 70 cc. of acetic acid anhydride were first added and then 25 cc. of 66% hydrogen bromide were added. The resulting mixture was again refluxed for one hour on an oil bath (internal temperature 105° C.). The acid was then distilled out of the reaction mixture in vacuo. The distillation residue was admixed with 100 cc. of 5% hydrogen bromide and the mixture was heated for one hour on a boiling water bath. After addition of charcoal the mixture was vacuum filtered and the filtrate was concentrated by evaporation in vacuo. The residue crystallized in glacial acetic acid upon inoculation. The crystalline precipitate was separated by vacuum filtration and was washed first with glacial acetic acid and then with a mixture of acetone and ether (1:1). After evaporation of the mother liquor, the same was again subjected to crystallization. The raw product was recrystallized by dissolving it in a small amount of hot n-butanol, vacuum filtering the solution through charcoal and then reprecipitating it slowly with ether. 3.5 gm. (62.8% of theory) of the product of the formula

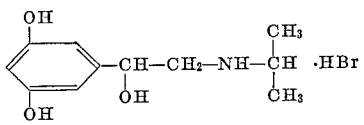

were obtained. It had a melting point of 184° C.

Example 3.—1-(3,5-dihydroxyphenyl)-1-hydroxy-2-isopropylaminoethane hydrobromide by Method C (a) Preparation of 1 - (3,5 - dimethoxyphenyl)-1-hydroxy-2-bromoethane: A mixture of 50.5 gm. of 3,5-dimethoxy-ω-bromoacetophenone, 126 gm. of aluminum isopropylate and 525 gm. of isopropanol was refluxed for three and one-half hours, accompanied by stirring. Thereafter, the major portion of the isopropanol was distilled off and the residue was admixed with 200 cc. of water. The resulting aqueous solution was extracted with ether, the ether extract solution was dried and the ether was distilled off. 30 gm. (59.5% of theory) of the compound of the formula

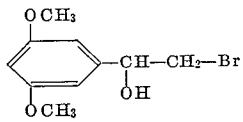

were obtained. It had a boiling point of 143° C. at 0.1 mm. Hg.

(b) Preparation of 3,5-dimethoxyphenylethylene oxide: 28.5 gm. of 1-(3,5-dimethoxyphenyl)-1-hydroxy-2-bromoethane were admixed with 50 cc. of alcohol and a solution of 8.95 gm. of KOH in 75 cc. of alcohol, and the resulting mixture was stirred at room temperature for fifteen minutes. Thereafter, 500 cc. of water were added, and the reaction product was extracted by shaking with ether. The ether extract solution was washed three times with water, dried with $K_2CO_3$ and the ether was distilled off. 16 gm. (81.5% of theory) of the product having the formula

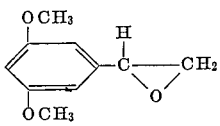

were obtained. It had a boiling point of 112° C. at 0.5 mm. Hg.

(c) Preparation of 1-(3,5-dimethoxyphenyl)-1-hydroxy-2-isopropylaminoethane hydrochloride: A mixture of 5 gm. of 3,5-dimethoxyphenylethylene oxide, 9.9 gm. of isopropylamine and 100 cc. of ethanol was heated for five hours at 70° C. in an autoclave. The reaction mixture was then evaporated, the residue was dissolved in methanol and an ether solution of hydrochloric acid was added. A precipitate formed which was purified by recrystallization from a mixture of methanol and ether. 5.1 gm. (66.5% of theory) of the compound

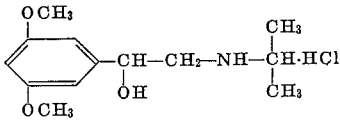

were obtained. It had a melting point of 147° C.

(d) The 1 - (3,5 - dimethoxyphenyl)-1-hydroxy-2-isopropylaminoethane hydrochloride was then converted into 1 - (3,5 - dihydroxyphenyl)-1-hydroxy-2-isopropylaminoethane hydrobromide by the process described in Example 2(c) above.

The compound of the Formula I, which is obtained by the above methods, is a racemic mixture and may be divided into its optically active antipodes according to known methods, for example by fractional crystallization of its salts with optically active acids, such as dibenzoyl- or ditoluyl-α-tartaric acid, as illustrated by the following example.

Example 4.—Separation of racemic 1-(3,5-dihydroxyphenyl) - 1-hydroxy-2-isopropylaminoethane into its optical antipodes A mixture of 95 gm. of di-p-toluyl-tartaric acid and 52.3 gm. of raceim 1-(3,5-dihydroxyphenyl)-1-hydroxy-2-isopropylaminoethane in 400 cc. of 50% isopropanol was refluxed for one-half hour until the solution became clear, and the product was then allowed to crystallize out. The product had a melting point of 163–164° C. and a specific rotation $[\alpha]_D = -89.6°$ (5%, in methanol). The yield was 92 gm. This product was repeatedly recrystallized from 50% isopropanol until the specific rotation and the melting point remained constant, which occurred after about the third recrystallization, $[\alpha]_D = -73.6°$; M.P. 165–166° C.

32.5 gm. of this di-p-toluyl-tartaric acid salt of 1-(3,5-dihydroxyphenyl)-1-hydroxy-2-isopropylaminoethane were dissolved by heating in 150 cc. of ethanol. 32 cc. of a 21% ethanolic solution of hydrochloric acid were added and the resulting solution was admixed with 700 cc. of ether, whereby a precipitate was formed, which was redissolved in ethanol and reprecipitated with ether from the solution. Dextrorotatory 1-(3,5-dihydroxyphenyl)-1-hydroxy-2-isopropylaminoethane hydrochloride having a melting point of 212–213° C. and a specific rotation $[\alpha]_D = +45.2°$ (5%, in methanol) was obtained.

The mother liquor of the first crystallization was evaporated to dryness, yielding 45 gm. of a crystalline substance having a specific rotation $[\alpha]_D = -112°$ (5%, in methanol). Using a procedure analogous to that described above for obtaining the dextrorotary antipode, levorotatory 1-(3,5 - dihydroxyphenyl) - 1 - hydroxy-2-isopropylaminoethane was obtained which had a melting point of 212° C. and a specific rotation $[\alpha]_D = -45.0°$ (5%, in methanol).

The compounds of the present invention, that is, 1-(3,5-dihydroxyphenyl)-1-hydroxy-2-isopropylaminoethane and its nontoxic, pharmacologically acceptable acid addition salts, have useful pharmacodynamic properties. More particularly, in warm-blooded animals, such as mice, rats and guinea pigs, they exhibit very effective bronchospasmolytic activities, hypotensive activities, and exert a particularly favorable influence upon disturbances in the transmission of the cardiac stimulus, as evidenced by an increase in the force of contraction of the auricle and an increase in the heartbeat frequency. At the same time, they are virtually free from undesirable side effects, such as hyperglycemic activity. In all of these areas of indication the compounds of the present invention are surprisingly and unexpectedly superior to known compounds of similar structure, especially with respect to compatibility and longer duration of effective action. When administered perorally, they exhibit subtsantially improved resorption properties and are therefore more easily administered at the proper dosage level. Moreover, the compounds according to the present invention exhibit greater stability than the prior art analogs, so that they exhibit greater stability during manufacture and also improved shelf life. The improved stability also renders them more readily compoundable with inert substances into dosage unit compositions.

Compounds having a structure very similar to that of the compounds according to the present invention have been described in the prior art, but the pattern of pharmacological properties of these prior art compounds could not lead one skilled in the art to suspect that 1-(3,5-dihydroxyphenyl) - 1-hydroxy-2-isopropylaminoethane and its nontoxic acid addition salts would have the advantageous properties which they exhibit.

More particularly, German Patent No. 865,315 broadly discloses a process for the preparation of, inter alia, a group of compounds of the formula

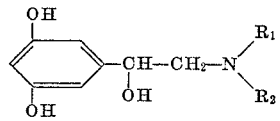

wherein $R_1$ and $R_2$ are said to represent hydrogen or aliphatic or cycloaliphatic hydrocarbon radicals. However, the only specific compounds of this class actually described in the German patent are the following:

(A) 1 - (3,5-dihydroxyphenyl)-1-hydroxy-2-dimethylaminoethane and its hydrochloride

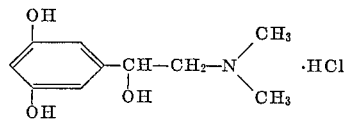

(B) 1 - (3,5 - dihydroxyphenyl)-1-hydroxy-2-(methylbenzylamino)ethane and its hydrochloride

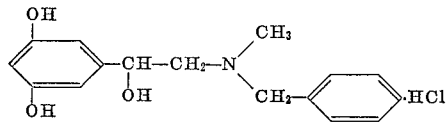

(C) 1 - (3,5 - dihydroxyphenyl)-1-hydroxy-2-(methylamino)ethane and its hydrobromide

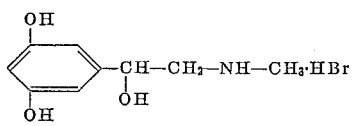

and (D) 1-(3,5-dihydroxyphenyl) - 1 - hydroxy-2-aminoethane and its hydrochloride

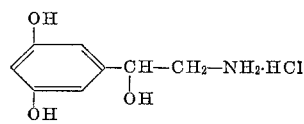

U.S. Patent No. 2,308,232 to Scheuing et al. describes 1-(3,4-dihydroxyphenyl)-2-isopropylaminoethane of the formula

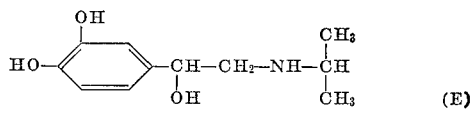

and its sulfate.

Thus, while both of these prior patents describe closely related compounds, they do not describe, in the statutory sense, the compounds according to the present invention.

In order to demonstrate their unexpectedly improved properties, the compounds of the present invention were pharmacologically tested in comparison with the above prior art analogs. It was found that 1-(3,5-dihydroxyphenyl)-1-hydroxy-2-isopropylaminoethane is considerably more stable than compound E (Scheuing et al.) and therefore has a much longer duration of effective action and exhibits fifty times better oral resorption than compound E in dogs.

As to bronchospasmolytic activity, the compounds in question were tested by the standard method of Kouzett and Rössler [Archiv für experimentelle Patholgie und Pharmakologie 195, 71 (1940)] in guinea pigs under urethane anesthesia in which bronchospasms had been artificially induced with acetylcholine. The compounds under investigation were administered intravenously at various dosage levels, and the dosage necessary to reduce the bronchospasms by 50% was determined. The results were expressed in terms of relative value of bronchospasmolytic activity in relation to a unit activity of 1 for 1-(3,5-dihydroxyphenyl) - 1 - hydroxy-2-isopropylaminoethane.

The following table shows the results of these tests:

TABLE I

| Compound: | Relative value of bronchospasmolytic activity |
| --- | --- |
| A | <1/1000 |
| B | <1/1000 |
| C | 1/200 |
| D | <1/1000 |
| E | 50 |
| 1-(3,5-dihydroxyphenyl)-1-hydroxy-2-isopropylaminoethane | 1 |

Thus, with the exception of compound E, the bronchospasmolytic activity of the prior art compounds is only a small fraction of that of the compound according to the invention. Purely quantitatively, the bronchospasmolytic activity of 1-(3,5-dihydroxyphenyl)-1-hydroxy-2-isopropylaminoethane was found to be fifty times weaker than that of compound E; however, taking into consideration the longer duration of effective action, its bronchospasmolytic activity is only about twelve times weaker than compound E. Consequently, the absolute weaker bronchospasmolytic activity of the novel compound is more than compensated by the greater duration of effective action and especially by the surprisingly improved oral resorption.

As the cardiac action, 1-(3,5-dihydroxyphenyl)-1-hydroxy-2-isopropylaminoethane acts positively inotropic and positively chronotropic, but in comparison to compound E, it has a less pronounced affinity toward influencing the rhythmicity in the right auricle, and in the left auricle and papillar muscle it less frequently causes the occurrence of spontaneous rhythmicity. Even at high dosages the novel compound does not produce cardiac arrhythmia but, to the contrary, produces a certain antiarrhythmic effect, which is not the case with compound E.

The compound according to the present invention and those described in the above indicated prior art were tested in isolated auricles of guinea pigs for their effect on the force of contraction and the heat frequency. The following table shows the results obtained:

TABLE II

| Compound | Concentration | Effect on force of contraction, Percent | Effect on frequency, Percent |
| --- | --- | --- | --- |
| A (γ/50 ml.) | 100 | +11 | +3 |
|  | 300 | +14 | +3 |
|  | 1000 | +23 | −1 |
| B (γ/50 ml.) | 100 | −8 | −2 |
|  | 300 | −1 | −7 |
|  | 1000 | −6 | ±0 |
| C (γ/5 ml.) | 3 | +15 | ±0 |
|  | 10 | +14 | +4 |
|  | 30 | +19 | +7 |
|  | 100 | +21 | +8 |
| D (γ/5 ml.) | 3 | +13 | +1 |
|  | 10 | +15 | +2 |
|  | 30 | +25 | +5 |
|  | 100 | +27 | +20 |
| 1-(3,5-dihydroxyphenyl)-2-isopropylaminoethane. (γ/50 ml.). | 0.3 | +21 | +5 |
|  | 1.0 | +24 | +12 |
|  | 3.0 | +58 | +22 |

These results rather clearly show that the novel compound exhibits significantly more favorable cardiac activities than any of the prior art analogs, which is an predicted from the combination of properties of the analogous prior art compounds. The following table summarizes the properties of each of the compounds:

TABLE IV

| Compound | Bronchospasmolytic activity | Effect on blood pressure | Cardiac activity | Side effects |
|---|---|---|---|---|
| A | Very weak; too weak for practical pharmacological utility. | Increase | Very weak increase in force of contraction; negligible increase in frequency. | N.D. |
| B | do | No effect or very weak decrease. | Decrease in both force of contraction and frequency. | N.D. |
| C | Weak | Increase | Weak increase in force of contraction; negligible effect on frequency. | Relatively strong hyperglycemic activity. |
| D | Very weak; too weak for practical pharmacological utility. | do | Weak increase in force of contraction; negligible increase in frequency. | N.D. |
| E | High, but only moderate duration of effective action. Not absorbed by peroral route. | Moderate decrease. | Causes cardiac arrhythmia | Not investigated. |
| 1-(3,5-dihydroxyphenyl)-1-hydroxy-2-isopropylaminoethane. | Moderate, but of long duration. Easily and rapidly absorbed per os. | Slight decrease | Substantial increase in force of contraction and frequency; anti-arrhythmic effect. | Low hyperglycemic activity. |

N.D.—not determined because of negligible bronchospasmolytic activity.

important factor to be considered in conjunction with the bronchospasmolytic activity.

The compounds in question were further tested for their effect upon the blood pressure in the carotid artery of decapitated cats. The individual compounds were intravenously injected, and their effect on the blood pressure was measured with the aid of a mercury manometer. The following results were obtained:

TABLE III

| Compound | Effect on blood pressure |
|---|---|
| A | In three separate tests, doses of 0.1-1 mgm./kg. i.v. produced an increase in the blood pressure of 18-98 mm. Hg, depending on the size of the dose. |
| B | In one test, doses of 0.1-1 mgm./kg. i.v. had no effect on the blood pressure. In two additional tests, the same doses produced a slight decrease in blood pressure of 7-14 mm. Hg, depending upon the size of the dose. |
| C | In three tests, doses of 3-100 $\gamma$/kg. i.v. produced an increase in the blood pressure of about 12-73 mm. Hg, depending upon the size of the dose. |
| D | In three tests, doses of 10-100 $\gamma$/kg. i.v. produced an increase in the blood pressure of 10-112 mm. Hg, depending upon the size of the dose. |
| E | In three tests, doses of 0.1-1.0 $\gamma$/kg. i.v. produced a decrease in the blood pressure of 17-42 mm. Hg, depending upon the size of the dose. |
| 1-(3,5-dihydroxyphenyl)-1-hydroxy-2-isopropylaminoethane. | In three tests, doses of 3 to 30 $\gamma$/kg. i.v. produced a decrease in the blood pressure of 5-25 mm. Hg, depending on the size of the dose. |

These results indicate that, with the exception of compound E, the prior art compounds increase the blood pressure (A, C and D) or have an unreliable, minor effect thereon (B), whereas the compound of the present invention exhibits reliable hypotensive activity.

As to undesirable side effects, the novel compound according to the invention was compared with the nearest analog of the German patent with respect to hyperglycemic activity. The blood sugar level of two groups of normal laboratory rats was determined by customary analytical methods, and then 1 mgm./kg. of each of the compounds in question was subcutaneously injected separately into the two groups of rats. Thereafter, the blood sugar level was again determined. It was found that compound C increased the blood sugar level by 38%, whereas the compound of the present invention increased it by only 18%. In other words, the hyperglycemic activity of the novel compound is less than half of that of compound C.

Toxicological tests on mice showed that the toxicity (LD$_{50}$) of 1 - (3,5-dihydroxyphenyl) - 1 - hydroxy - 2 - isopropylaminoethane is 114 mgm./kg. intravenously, 290 mgm./kg. subcutaneously and 4.8 gm./kg. perorally.

Considering the overall pharmacodynamic picture of the compounds of the prior art and of the compound of the invention as a whole, the compound of the present invention exhibits a significantly more favorable and advantageous combination of properties, which could not have been Quite evidently, the compound according to the invention exhibits that combination of properties which is most desirable in a bronchospasmolytic.

For pharmaceutical purposes, the compounds according to the present invention may be administered in the form of the free base or also in the form of a nontoxic, pharmacologically acceptable acid addition salt of the base. Examples of such acid addition salts are the following: the hydrochloride, hydrobromide, sulfate, phosphate, nitrate, acetate, propionate, butyrate, valerate, oxalate, malonate, succinate, maleate, fumarate, lactate, tartrate, citrate, malate, benzoate, phthalate, cinnamate, salicylate, nicotinate and 2-furoate.

The compound of the invention or a nontoxic acid addition salt thereof is conveniently administered to warm-blooded animals perorally, parenterally, rectally or through the respiratory tract as an active ingredient in a customary dosage unit composition, that is, a composition in dosage unit form consisting essentially of an inert pharmaceutical carrier and one dosage unit of the active ingredient. Such a composition may take the form of a tablet, hypodermic solution, suppository, inhalation solution or the like. One dosage unit of the compounds of the present invention ranges from 0.004 to 0.5 mgm./kg. body weight depending upon the route of administration.

More particularly, the average peroral dosage unit is 0.08 to 0.5 mgm./kg. preferably 0.15 to 0.5 mgm./kg., and the average parenteral dosage unit is 0.004 to 0.016 mgm./kg., preferably 0.008 mgm./kg. For administration by the respiratory route a 2% aerosol inhalation solution is used.

The following examples illustrate a few bronchospasmolytic dosage unit compositions according to the present invention comprising the compound of the Formula I or a nontoxic acid addition salt thereof as the active ingredient. The parts are parts by weight, unless otherwise specified.

Example 5.—Tablets

The tablet composition was compounded from the following ingredients:

| | Parts |
|---|---|
| 1 - (3,5 - dihydroxyphenyl)-1-hydroxy-2-isopropylaminoethane sulfate | 5.0 |
| Lactose, powdered | 35.4 |
| Corn starch, dry | 33.0 |
| Finely divided SiO$_2$ | 5.6 |
| Polyvinyl pyrrolidone | 0.6 |
| Magnesium stearate | 0.4 |
| Total | 80.0 |

*Compounding procedure.*—The 1-(3,5-dihydroxyphenyl)-1-hydroxy-2-isopropylaminoethane sulfate was thoroughly admixed with the lactose, 25.0 parts of the corn starch and 4.0 parts of the SiO₂, and the resulting mixture was uniformly moistened with a 5% ethanolic solution of the polyvinyl pyrrolidone. The moist mass was then passed through a 1 mm. mesh screen. The resulting granulate was dried for about 24 hours at 60° C. in a drying chamber with fresh air circulation. The dry granulate was again passed through a 1 mm. mesh screen. 70.0 parts of this granulate were admixed in a suitable mixer with a mixture consisting of the remainder of the SiO₂, the remainder of the corn starch and all of the magnesium stearate, this mixture having previously been passed through a 1 mm. mesh screen. The resulting mixture was then pressed into tablets, each weighing 80 mgm. and containing 5.0 mgm. of the active ingredient. When administered perorally to warm-blooded animals of about 60 kg. body weight requiring bronchospasmolytic treatment, these tablets brake up in the stomach within fifty seconds and produced very good bronchospasmolytic effects.

Example 6.—2% inhalation solution

This solution was packaged in 10 ml. bottles, the contents of each bottle being composed of the following ingredients:

1 - (3,5 - dihydroxyphenyl)-1-hydroxy-2-isopropyl-
  aminoethane sulfate _____ mgm__ 200.0
Sodium pyrosulfite _____ mgm__ 1.0
Disodium salt of ethylenediaminetetraacetic
  acid _____ mgm__ 5.0
1/10 N HCl, q.s. ad. pH 3.
Minerals-free water, q.s. ad. _____ __ml__ 10.0

These ingredients formed a clear, colorless solution with a pH of 3, which was dispensed with the aid of a metered aerosol inhalation vaporizer having an aerosol output capacity of 12.5 liters per minute. When administered by the bronchial route to warm-blooded animals of about 60kg. body weight, requiring bronchospasmolytic treatment, 1 to 2 metered bursts produced very good bronchospasmolytic effects.

Example 7.—Ampules with hypodermic solution

Each ampule contained a sterile solution composed of the following ingredients:

1 - (3,5 - dihydroxyphenyl) - 1 - hydroxy-2-isopropyl-
  aminoethane sulfate _____ mgm__ 0.5
Sodium pyrosulfite _____ mgm__ 0.1
Disodium salt of ethylenediaminetetraacetic
  acid _____ mgm__ 0.5
Sodium chloride _____ mgm__ 8.0
1/10 N HCl, q.s. ad. pH 3.
Distilled water _____ ml__ 1.0

When administered by the parenteral route to warm-blooded animals of about 60 kg. body weight requiring bronchospasmolytic treatment, the contents of the ampule produced very effective bronchospasmolytic effects.

Example 8.—Suppositories

The suppository composition was compounded from the following ingredients:

| | Parts |
|---|---|
| 1-(3,5 - dihydroxyphenyl) - 1 - hydroxy-2-isopropylaminoethane sulfate | 5.0 |
| Lactose, powdered | 45.0 |
| Suppository base (cocoa butter) | 1650.0 |
| Total | 1700.0 |

Compounding procedure.—The 1-(3,5-dihydroxyphenyl)-1-hydroxy-2-isopropylaminoethane sulfate was thoroughly blended with the powdered lactose, and the resulting mixture was homogeneously distributed in the molten cocoa butter. The composition was then poured into suppository molds holding 1.7 gm. of the composition. Each suppository contained 5 mgm. of the active ingredient and, when administered by the rectal route to warm-blooded animals of about 60 kg. body weight requiring bronchospasmolytic treatment, produced very good bronchospasmolytic effects.

Example 9.—Starch capsules for peroral administration

The contents of the capsules were compounded from the following ingredients:

| | Parts |
|---|---|
| 1-(3,5 - dihydroxyphenyl) - 1 - hydroxy-2-isopropylaminoethane sulfate | 5.0 |
| Lactose | 495.0 |
| Corn starch | 500.0 |
| Total | 1000.0 |

Compounding procedure.—The 1-(3,5-dihydroxyphenyl)-1-hydroxy-2-isopropylaminoethane sulfate was gradually admixed with the lactose. When all of the lactose has been incorporated, the mixture was blended with the corn starch. The resulting mixture was filled into capsules holding 1 gm. of the mixture. Each capsule contained 5.0 mgm. of the active ingredient and, when administered by the oral route to warm-blooded animals of about 60 kg. body weight requiring bronchospasmolytic treatment, produced very good bronchospasmolytic effects.

The above dosage unit compositions are merely illustrative examples of the varied forms in which the compounds according to the invention may be administered for therapeutic purposes. Of course, in place of the 1-(3,5-dihydroxyphenyl) - 1 - hydroxy - 2 - isopropylaminoethane sulfate, the free base or any of the other nontoxic acid addition salts of this compound may be substituted in these dosage unit composition examples.

While we have illustrated our invention with the aid of certain specific embodiments, it will be readily apparent to those skilled in the art that our invention is not limited to those embodiments and that various other changes and modifications may be made without departing from the spirit of the invention or the scope of the appended claims.

We claim:

1. A bronchospasmolytic composition in a dosage unit form of a tablet, hypodermic solution, suppository or inhalation solution consisting essentially of an inert pharmaceutical carrier and an effective bronchospasmolytic dose of 1-(3,5-dihydroxyphenyl) - 1 - hydroxy-2-isopropylaminoethane or a nontoxic, pharmacologically acceptable acid addition salt thereof.

2. The method of relieving bronchial spasms in warm-blooded animals requiring such treatment, which comprises administering to said animals an effective bronchospasmolytic dose of 1-(3,5 - dihydroxyphenyl) - 1 - hydroxy-2-isopropylaminoethane or a nontoxic, pharmacologically acceptable acid addition salt thereof.

3. The method of relieving bronchial spasms in warm-blooded animals requiring such treatment, which comprises administering to said animals through the bronchial tract an effective bronchospasmolytic amount of 1-(3,5 - di - hydroxyphenyl)-1-hydroxy-2-isopropylaminoethane or a nontoxic, pharmacologically acceptable acid addition salt thereof.

(References on following page)

References Cited

UNITED STATES PATENTS

| | | | |
|---|---|---|---|
| 2,725,399 | 11/1955 | Denton | 260—570.6 |
| 2,765,307 | 10/1956 | Schmedle | 260—247.7 |
| 2,766,286 | 10/1956 | D'Amato | 260—570.6 |
| 2,820,739 | 1/1958 | Brown | 167—65 |
| 2,937,118 | 5/1960 | Van Haxthausen | 167—65 |
| 3,048,633 | 8/1962 | Russell et al. | 260—570.6 X |

FOREIGN PATENTS

| | | |
|---|---|---|
| 865,315 | 2/1953 | Germany. |

OTHER REFERENCES

Moed et. al.: "Recueil Trav. Chim.," vol. 71, pp. 935–937 (1952).

ALBERT T. MEYERS, *Primary Examiner.*

S. J. FRIEDMAN, *Assistant Examiner.*

U.S. Cl. X.R.

424—285, 316, 330